UNITED STATES PATENT OFFICE.

WILLIAM B. HEINTZE, OF BROOKLYN, NEW YORK.

MANUFACTURE OF BRICKS.

SPECIFICATION forming part of Letters Patent No. 306,828, dated October 21, 1884.

Application filed June 6, 1884. (No specimens.)

*To all whom it may concern:*

Be it known that I, WILLIAM B. HEINTZE, of Brooklyn, county of Kings, and State of New York, have invented certain new and useful Improvements in the Manufacture of Bricks, of which the following is a specification.

This invention has reference to the manufacture of unburned or "sun-dried" bricks, which are specially intended for use in filling walls of frame and other houses; and the invention consists of bricks made of a mixture of oyster-shell lime, coal-ashes, white clay, red clay, and cut-up salt hay.

In carrying out my invention, three parts by weight of oyster-shell lime, or other suitable lime or cement, is mixed with water to milk of lime; seven parts of screened coal-ashes, coal-dust, spent molder's sand, pulverized slag, or a mixture of these materials, are then added to and thoroughly mixed with the milk of lime. Four parts by weight of white clay dissolved with salt-water are added to the foregoing mixture; next a proportionate quantity of salt hay, or hay from grass grown on salt meadows, which grass is tough and dry, and finally four parts of red clay, which substances are intimately mixed together until the mass has the proper consistency required for pressing the same into the required form, which is done by hand or machines. The bricks are then dried either in the open air or in rooms heated to the required degree of temperature.

Bricks of any size and for different purposes may be made from this composition. When they are specially intended for filling of frame buildings they are made of a slightly greater thickness than the supporting-joists, so as to properly fill up the space between the same. The bricks are strong, durable, and considerably cheaper than burned bricks.

Having thus described my invention, I claim as new and desire to secure by Letters Patent—

1. A composition for unburned bricks, consisting of oyster-shell lime, coal-ashes or sand, white clay, red clay, and cut-up salt hay, substantially as set forth.

2. As a new article of manufacture, bricks made of the composition described, pressed into shape and dried without burning, substantially as described.

In testimony that I claim the foregoing as my invention I have signed my name in presence of two subscribing witnesses.

WILLIAM B. HEINTZE.

Witnesses:
CARL KARP,
SIDNEY MANN.